US006886264B2

United States Patent
Sakata et al.

(10) Patent No.: US 6,886,264 B2
(45) Date of Patent: May 3, 2005

(54) REFERENCE FIXTURE FOR ROUNDNESS MEASURING INSTRUMENT

(75) Inventors: Yukihiro Sakata, Kawasaki (JP); Yoshiyuki Oomori, Kure (JP); Hideki Shindo, Kure (JP); Kazushi Noguchi, Kure (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/819,824

(22) Filed: Apr. 7, 2004

(65) Prior Publication Data

US 2004/0200085 A1 Oct. 14, 2004

(30) Foreign Application Priority Data

Apr. 11, 2003 (JP) ........................................ 2003-107855

(51) Int. Cl.$^7$ .............................................. G01C 25/00
(52) U.S. Cl. ............................. 33/502; 33/550; 73/1.79
(58) Field of Search ........................... 33/502, 543, 550, 33/551, 553, 554, 556, 567; 73/1.79

(56) References Cited

U.S. PATENT DOCUMENTS

| 4,523,450 | A | * | 6/1985 | Herzog ......................... 33/502 |
| 4,932,136 | A | * | 6/1990 | Schmitz et al. ............... 33/502 |
| 4,962,591 | A | * | 10/1990 | Zeller et al. ................... 33/502 |
| 4,982,504 | A | * | 1/1991 | Soderberg et al. ............. 33/502 |
| 5,269,067 | A | * | 12/1993 | Waeldele et al. .............. 33/502 |
| 6,493,956 | B1 | * | 12/2002 | Matsuda ....................... 33/502 |
| 6,748,790 | B2 | * | 6/2004 | Abbe .......................... 73/1.79 |
| 2004/0003647 | A1 | * | 1/2004 | Nashiki et al. ............... 73/1.79 |
| 2004/0244464 | A1 | * | 12/2004 | Hajdukiewicz et al. ........ 73/1.79 |

FOREIGN PATENT DOCUMENTS

| JP | 11-339052 | 12/1999 |
| JP | 2000-331171 | 11/2000 |
| JP | 2004-108883 | 4/2004 |

* cited by examiner

Primary Examiner—G. Bradley Bennett
(74) Attorney, Agent, or Firm—Rankin, Hill, Porter & Clark LLP (57) ABSTRACT

A reference fixture (20) for a roundness measuring instrument performs acquisition of origin information of a roundness measuring instrument (1) including a workpiece rotary mechanism (3) on which a workpiece is set and a probe (14) provided with a stylus (14a) and also performs calibration of the probe (14). The reference fixture (20) includes a mount (21), a calibration master (22) provided on a top face of the mount (21) for calibrating the sensitivity of the probe (14), an origin ball (23) disposed above the calibration master (22) for providing the origin information of the roundness measuring instrument (1) by the stylus (14a) of the probe (14), and a holder (25) that holds the origin ball (23).

8 Claims, 7 Drawing Sheets

REFERENCE FIXTURE FOR ROUNDNESS MEASURING INSTRUMENT

BACKGROUND OF THE INVENTION

1. Field of the Invention

The present invention relates to a reference fixture for a roundness measuring instrument, particularly, the one that can acquire origin information of the roundness measuring instrument and calibrate a detector thereof.

2. Description of Related Art

Conventionally, a roundness measuring instrument, which is one type of form measuring instrument, have been used as a measuring instrument that measure geometrical deviation such as roundness, flatness and parallelism of an object to be measured.

Such roundness measuring instrument has a detector provided with a sensor at a distal end of a lever capable of swinging in a direction orthogonal to the surface of a workpiece, or the object to be measured. A measurement data is acquired by the detector scanning along the surface of the workpiece with the sensor contacting the surface of the workpiece and collecting the data so as to measure roundness, cylindricity, straightness, coordinate or dimension of the workpiece.

In the above roundness measuring instrument, in order to measure the workpiece accurately and smoothly, setting for an origin of the roundness measuring instrument and sensitivity calibration of the detector are preferably completed before starting the measurement.

A first method known for setting the origin to acquire a coordinate value of a workpiece is that which performs form analysis of a scanning locus and sets an origin based on a cross point of a form element (e.g., JP2002-270307 (JP2004-10883 A)).

There has been a second method that arranges a reference ball (origin ball) on a workpiece rotary mechanism provided with a turntable, which is rotatable with a workpiece being set thereon, so as to acquire origin information by measuring the surface of the origin ball. In such case, the origin ball is fixed on a shank perpendicularly disposed on the workpiece rotary mechanism. In the second method, for calibrating the detector, a calibration master is provided on the workpiece rotary mechanism, so that sensitivity error of the detector is detected for compensating the error by measuring the calibration master.

At the origin setting according to the above publication, since a calculation process on the basis of the form analysis is complicated, the calculation process takes a long time whereas a large calculation program needs to be built.

In the second method, since the shank holding the origin ball is perpendicularly provided on the workpiece rotary mechanism, the orientation of the detector becomes upward, thus being impossible to measure a bottom face of the origin ball. Therefore, data cannot be acquired from the face unavailable for the measurement, thereby impossible to acquire highly accurate origin information.

In the second method, the calibration master and the origin ball each are provided as separate components. Prior to CNC (Computer Numerical Control) measurement, machine origin information is acquired with use of the origin ball, and then, the sensitivity of the detector is adjusted with use of the calibration master in addition to the acquisition for the origin information. At this time, an operator holds the origin ball by hand to set on the workpiece rotary mechanism, removes the origin ball from the workpiece rotary mechanism after acquiring the origin information, sets the calibration master on the workpiece rotary mechanism by hand and removes the calibration master after the sensitivity adjustment of the detector is completed. Thus, since the origin ball and the calibration master need to be replaced, the preparation takes a long time and is inconvenient in use.

When the origin ball and the calibration master are replaced, since the operator touches the calibration master by hand, an affection on the calibration master due to body temperature of the operator may be the bottleneck in improvement of measuring accuracy.

SUMMARY OF THE INVENTION

An object of the present invention is to provide a reference fixture for a roundness measuring instrument that eliminates the need for a large calculation program or the like, enables to continuously perform acquisition of origin information of the roundness measuring instrument and sensitivity adjustment of a detector thereof and enhances a measuring efficiency and measuring accuracy.

A reference fixture for a roundness measuring instrument according to an aspect of the present invention acquires origin information of the roundness measuring instrument that includes a workpiece rotary mechanism rotatable with a workpiece being set thereon and the detector having a sensor for measuring a surface profile of the workpiece, and calibrates a detector thereof, the reference fixture including: a mount provided on a top face of the workpiece rotary mechanism; a calibration master provided on a top face of the mount for calibrating the sensitivity of the detector by the sensor of the detector; a reference ball disposed above the calibration master for providing the origin information of the roundness measuring instrument by the sensor of the detector; and a holder provided on the calibration master to hold the reference ball, wherein the holder is formed in a dimension capable of measuring the reference ball by the detector in Z-axis direction representing an axis line direction of the calibration master and in X-axis direction orthogonal to the axis line.

With this arrangement, the origin information of the roundness measuring instrument can be acquired since the reference fixture for the roundness measuring instrument is set on the workpiece rotary mechanism and the sensor of the detector of the roundness measuring instrument is related to the reference ball by contacting etc. whereas the sensitivity of the detector can be calibrated since the sensor of the detector is involved with the calibration master. Thus, it is not necessary to replace the reference ball and the calibration master at each time when the operator acquires the origin information or calibrates the sensitivity. Since the holder is formed in a shape capable of measuring the reference ball by the detector in the axial direction and the direction orthogonal to the axial direction of the calibration master, the detector can scan the surface of the reference ball in Z-axis direction or X-axis direction so as to detect the maximum point or the minimum point on the spherical surface as the origin information. Even when the position of the detector is changed, the origin information can be acquired in every position, thus easily acquiring the compensation value for the position of the detector along with the position change. Particularly, because the bottom face of the reference ball can be also scanned, the compensation value can be easily acquired corresponding to various positions of the detector.

Consequently, a large calculation program or the like is not necessary so that the acquisition for the origin information of the roundness measuring instrument and the sensitivity adjustment of the detector can be continuously performed, thus enhancing the measuring efficiency and the measuring accuracy.

In the above reference fixture for the roundness measuring instrument, the holder may preferably has an inclined part extending aslant toward the center of the calibration master.

With this arrangement, since the interference between the holder and the detector can be minimized in various positions of the detector, the origin information can be acquired in various positions of the detector.

Preferably, in the above reference fixture for the roundness measuring instrument, the inclined part of the holder is detachably provided on a shank standing upward on a top face of the calibration master.

With this arrangement, since the reference ball is provided on the inclined part of the holder while the inclined part is detachably attached on the shank, the reference ball can be replaced with new one when the reference ball is damaged etc.

When the reference ball is damaged etc., the inclined part may be removed from the shank to be replaced with new one, thus facilitating the manufacturing procedures as compared to that the origin ball is integrally formed with the shank and the inclined part.

In the above reference fixture for the roundness measuring instrument, a flat part may preferably formed on a part of a lateral periphery of the calibration master by cutting along the axial line of the calibration master with a predetermined reference dimension from the axis line so as to calibrate the sensitivity of the detector based on the result of that roundness of the lateral periphery of the calibration master including the flat part measured by the detector.

With this arrangement, the sensitivity of the detector can be easily calibrated based on the result in which the roundness of the lateral periphery of the calibration master including the flat part is measured by the detector.

At this time, the sensitivity can be calibrated according to not only a result of measuring the roundness by performing a whole periphery measurement against the lateral periphery of the calibration master including the flat part, but also a result of measuring the roundness by performing a partial periphery measurement against the lateral periphery of the calibration master including the flat part. Further, the sensitivity can be calibrated according to the minimum value of the flat part relative to the periphery by performing the partial periphery measurement against the lateral periphery of the calibration master including the flat part.

In the above reference fixture for the roundness measuring instrument, the detector of the roundness measuring instrument may preferably be rotatable at a predetermined angle around the rotation center, and a deviation detecting mark is formed on a surface of the reference ball along the longitude of the reference ball to detect a rotation deviation when the detector is rotated at the predetermined angle.

With this arrangement, in the roundness measuring instrument that can rotate the detector in some measure and change the position thereof, deviation on the position of the sensor (position where the sensor is related to the object to be measured) of the detector due to the position change can be detected by way of the detecting mark. The detecting mark may be a groove or a convex shape etc.

For example, if the detector can measure the displacement in X-axis direction in the reference position of the detector, the detector can measure the displacement in Y-axis direction by the detector being 90-degree turned from the former position. At this time, if the detector does not accurately rotate at 90 degrees, an error is occurred in X-axis direction of the sensor as a rotation deviation.

More specifically, the sensor is related to the reference ball at the reference position of the detector (e.g., by contacting a stylus to the reference ball), and the reference ball is rotated to acquire the rotation angle position of the reference ball, where the detecting mark is detected. Then, as the position of the detector being changed, the sensor is related to the reference ball, and the reference ball is rotated to detect the detecting mark in the same manner as described above. The rotation deviation of the sensor can be acquired according to the rotation angle position of the reference ball and the rotation angle position at the reference position at this time. Thus, even when the position of the detector is changed, the deviation of the position of the sensor can be acquired to compensate the deviation.

In the above reference fixture for the roundness measuring instrument, the detector of the roundness measuring instrument may preferably be rotatable at a predetermined angle around the rotation center, and a deviation detecting mark may preferably be formed on the other part of the lateral periphery of the calibration master along the axis direction to detect a rotation deviation when the detector is rotated at the predetermined angle.

With this arrangement, the rotation deviation of the detector can be detected by the detecting mark provided on the other part (where the flat part is not formed) of the lateral periphery of the calibration master to compensate the position of the sensor.

In the reference fixture for the roundness measuring instrument, the predetermined angle may preferably be approximately 180 degrees and the rotation deviation may preferably represents a deviation in Y-axis direction orthogonal to the X-axis direction to which the detector shifts on a horizontal plane and also orthogonal to the Z-axis direction.

With this arrangement, in the roundness measuring instrument, even when the mechanical division error might be occurred as the detector is approximately 180-degree reversed around the rotation center and the mechanism does not allow the detector to shift in Y-axis direction, the deviation in Y-axis direction, which is all to be calibrated, can be acquired by detecting the deviation detecting mark, thus acquiring the accurate origin information.

DETAILED DESCRIPTION OF PREFERRED EMBODIMENT(S)

An embodiment of the present invention will be described with reference to attached drawings.

Figure 1:
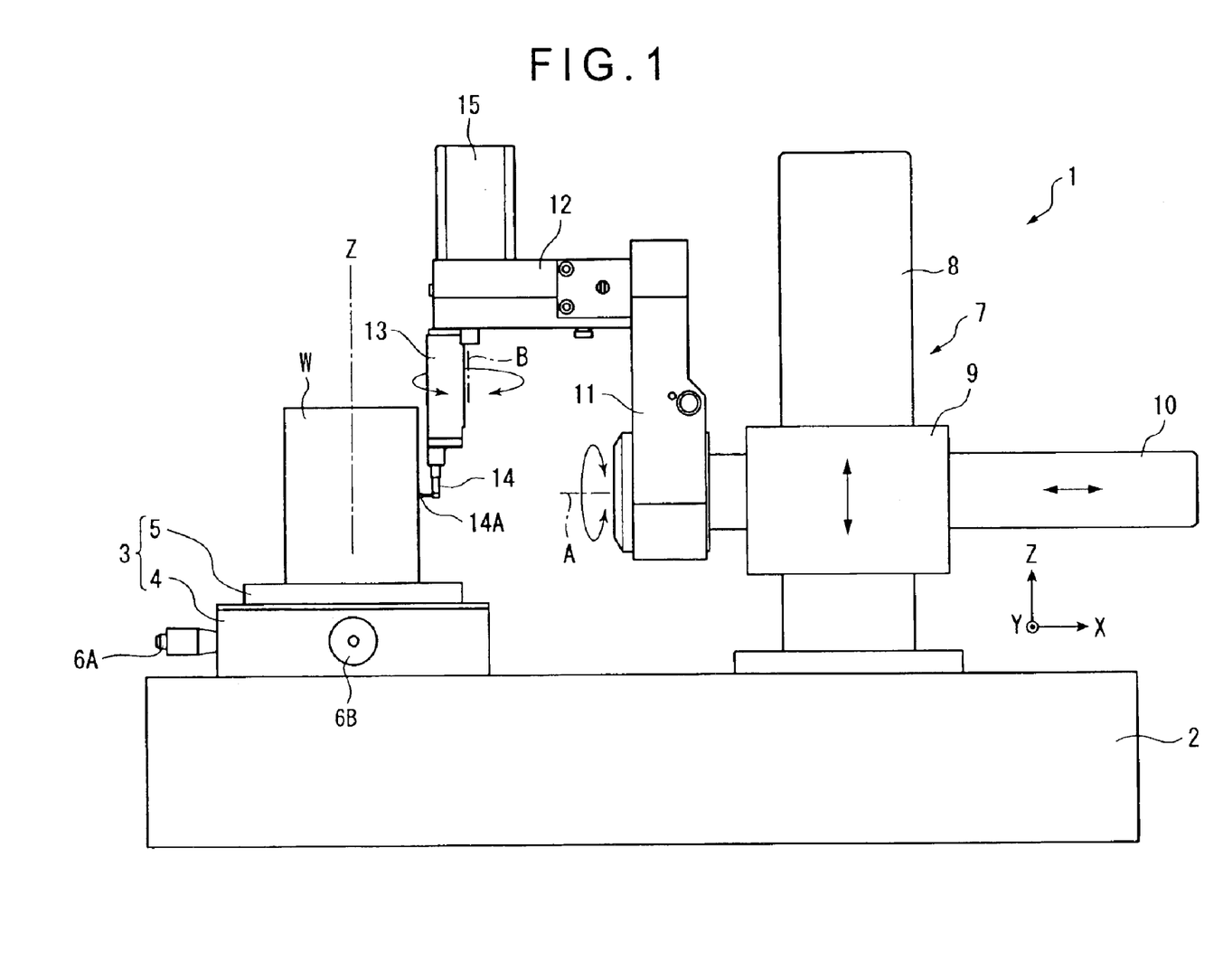
FIG. 1 is a general view showing a roundness measuring instrument in which a reference fixture for a roundness measuring instrument is used according to an embodiment of the present invention.
Figure 2:
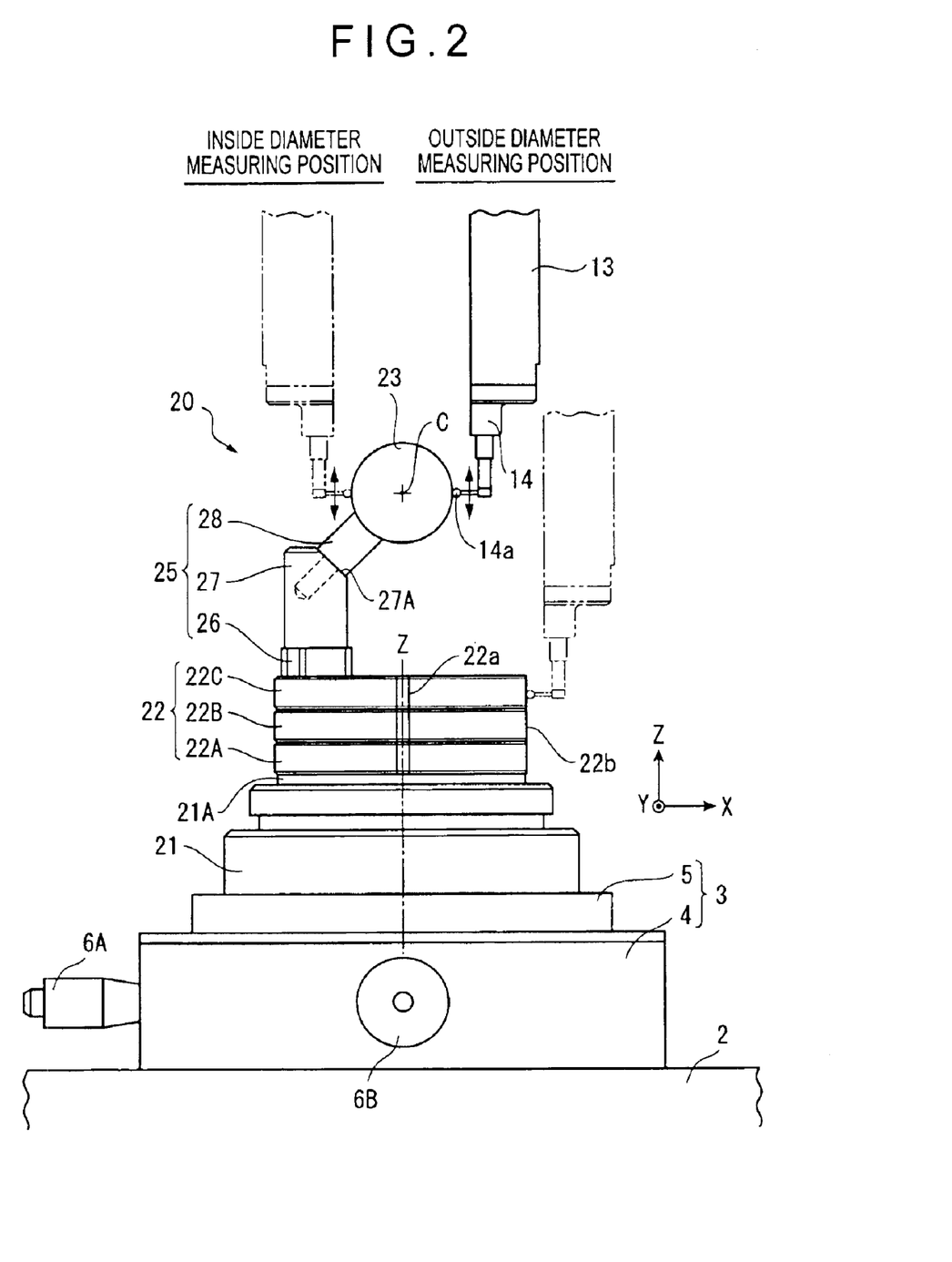
FIG. 2 is a front elevational view showing an example of using a prove in a vertical direction according to the embodiment.

FIG. 1 shows a roundness measuring instrument 1 in which a reference fixture 20 for the roundness measuring instrument (hereafter simply referred to as a reference fixture) shown in FIG. 2 and the following drawings according to the present invention.

The roundness measuring instrument 1 includes a base 2, a workpiece rotary mechanism 3 disposed on a top face of the base 2 and closer to a side thereof to rotate a workpiece W as an object to be measured and a position detecting mechanism 7 disposed on the top face of the base 2 and closer to the other side thereof to detect a position of the workpiece W on a external surface thereof.

The workpiece rotary mechanism 3 has a turntable 4 rotatably provided on the base 2 via a rotation driver mechanism (not shown) and an XY table 5 where the workpiece W is set on a top face of the turntable 4. The turntable 4 is provided with control knobs 6A and 6B for shifting the XY table 5 in directions (X-axis and Y-axis directions) orthogonal to each other and also orthogonal to a rotation center axis Z, and an inclination knob (not shown) for inclining a top face (workpiece setting face) of the XY table 5.

The position detecting mechanism 7 has a column 8 perpendicularly (parallel to the Z-axis) mounted on the base 2, a slider 9 that is arranged on the column 8 to be vertically movable, a first horizontal arm 10 that is provided on the slider 10 to be slidable in a direction orthogonal to the column 8 (direction orthogonal to the Z-axis, i.e., X-axis direction), a turning part 11 provided near a distal end side of the first horizontal arm 10 in a manner capable of turning around an axis line A of the first horizontal arm 10, a second horizontal arm 12 attached to the turning part 11 to be parallel to the first horizontal arm 10, a probe holder 13 arranged at the second horizontal arm 12 with being able to 180-degree reverse around an axis line B, a probe (detector) 14 provided on the probe holder 13 with a stylus (sensor) 14a and a motor 15 shifting the orientation of the probe holder 13 by rotating it.

Accordingly, by driving the motor 15, the probe holder 13 is turned at a predetermined angle (e.g., toward two 180-degree opposite positions) so that the position of the probe holder 13 can be reversed between an outside diameter measuring position for measuring the outside diameter of the workpiece W and an inside diameter measuring position for measuring the inside diameter of the workpiece W with use of the stylus 14a as shown in FIG. 2.

Figure 3:
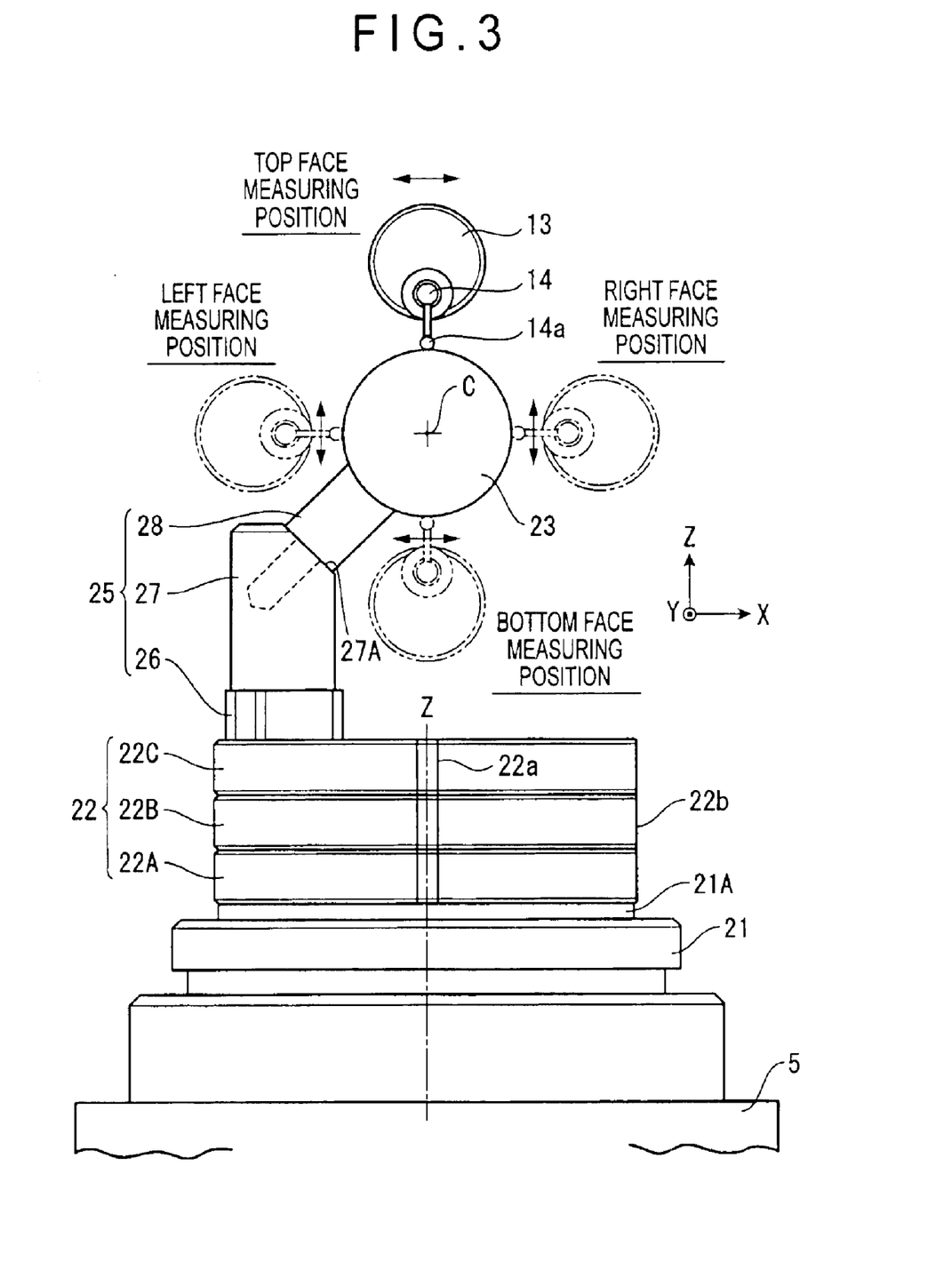
FIG. 3 is a front elevational view showing an example of using the prove in a horizontal direction according to the embodiment.

Referring to FIGS. 2 and 3, the reference fixture 20 is removably mounted on a top face of the XY table 5, the reference fixture 20 being provided with a mount 21 to be put on the top face of the XY table 5.

Figure 4:
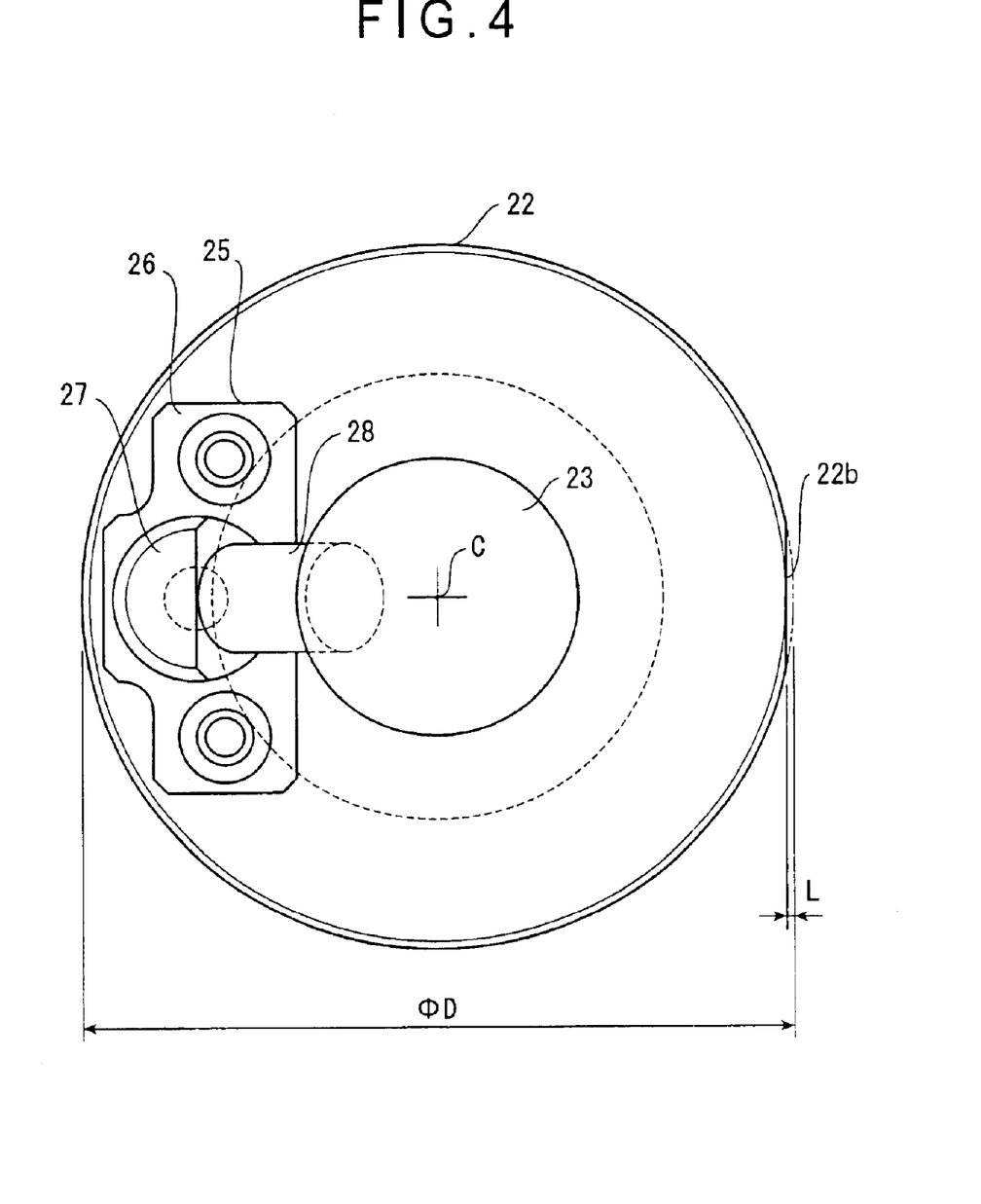
FIG. 4 is a plan view showing a primary portion according to the embodiment.

The mount 21 is formed in a disk-shape with steps including an upper stand 21A. A calibration master 22 is provided on a top face of the upper stand 21A for enabling sensitivity calibration. Referring to FIG. 4, the calibration master 22 is precisely formed with regard to its roundness and cylindricity so that an outside diameter φD is 50 mm, for instance, lateral periphery thereof being divided into three parts of master areas 22A, 22B and 22C. The calibration master 22 is provided with two grooves 22a on the periphery as indicating a reference angle position in an axial direction thereof, the position at the center of the two grooves 22a being defined as the reference angle position. The reference angle position is used if predefining a value by further precisely calibrating the calibration master 22. The grooves 22a also serve as a detecting mark described below.

Note that, the value predefinition means that a radius value of the calibration master 22 is precisely defined in advance at an arbitrary angle position against the reference angle position, thus compensating a rotation accuracy of the workpiece rotary mechanism 3 in the roundness measuring machine 1 according to the radius value per each angle.

An axial line of the calibration master 22 is coincident with an axial line of the mount 21. The control knobs 6A and 6B of the roundness measuring instrument 1 are used for adjustment when the reference fixture 20 is mounted on the XY table 5. As the axis line of the calibration master 22 and the mount 21 has been coincident with the rotation center axis Z of the XY table 5 by the alignment, the origin information is acquired and the sensitivity of the probe 14 is calibrated.

A flat part 22b is formed, for example, on a part of the periphery of the master area 22B of the calibration master 22 as specifically shown in FIG. 4 or the like. Since the flat part 22b is measured, the sensitivity of the probe 14 can be calibrated.

In other words, while the calibration master 22 is formed with the φD being 50 mm for instance as mentioned above, the flat part 22b is formed by cutting the part of the periphery of the calibration master 22 by 25 μm for example as a reference dimension so that the flat part 22b is parallel to the axial line of the calibration master 22.

In the case that the position of the stylus 14a is set so as to measure the flat part 22b of the calibration master 22, or to measure the dimension 25 μm, when the value (difference between the maximum value and the minimum value upon measurement of the periphery of the master area 22B including the flat part 22b of the calibration master 22) obtained by actually measuring the flat part 22b with use of the stylus 14a is different from 25 μm, an amount of difference represents a sensitivity error of the probe 14, and accordingly, the sensitivity is calibrated by compensating at a data processor (not shown) of the roundness measuring instrument 1 according to the amount of difference.

Alternatively, the sensitivity can be calibrated in accordance with the result that the roundness is acquired by measuring the periphery of the master area 22B including 22b of the calibration master 22. For example, in this embodiment, the sensitivity calibration can be determined as normal if the obtained roundness is 25 μm, or sensitivity calibration can be performed so as to be 25 μm if the roundness is other than 25 μm.

An origin ball (reference ball) 23 is disposed above the calibration master 22, the origin ball 23 providing the origin information of the roundness measuring instrument 1. The origin ball 23 is precisely formed, its center C locating on the axial line of the calibration master 22 while being the origin of the roundness measuring instrument 1.

The origin ball 23 is supported by a holder 25. The holder 25 arranged on the top face of the calibration master 22 and closer to the periphery thereof, the holder 25 having a block-shaped receiving part 26 fixed on the calibration master 22, a shank 27 attached to the receiving part 26 so as to project upward by a predetermined dimension and an inclined part 28 attached to the shank 27, the origin ball 23 being fixed on the an end of the inclined part 28. The shank 27 is, for instance, formed in a column-shaped member and provided with a cutting face 27A on a top face of the shank 27 being cut by approximately 45 degrees relative to the top face of the calibration master 22. The cutting face 27A faces toward the center axis of the calibration master 22 with a female thread being threaded on the cutting face 27A.

The inclined part 28 is formed in a round bar and attached to the cutting face 27A by threading a thread arranged at the other end of the inclined part 28 into the female thread. The inclined part 28 is formed in an outside diametrical dimension (in a dimensional form) so that an external surface of the origin ball 23 in the Z-axis and the X-axis directions can be measured by the probe 14, thus avoiding interference of the probe 14 and the stylus 14a with the origin ball 23.

As described above, since the origin ball 23 is supported by the holder 25 including the receiving part 26, the shank 27 with a predetermined height and the inclined part 28, a gap with a predetermined dimension is formed between a bottom face of the origin ball 23 and the top face of the calibration master 22. Additionally, since the inclined part 28 is attached to the shank 27 at approximately 45 degrees, the probe 14 is disposed below the origin ball 23 and the stylus 14a is oriented upward so that the lowermost face of the origin ball 23 can be measured in the X-axis direction as well as the uppermost face in the X-axis direction, the right face in Z-axis direction and the left face in the Z-axis direction as shown in FIG. 3.

As shown in FIGS. 6A to 7B, the origin ball 23 is provided with a notch line (deviation detecting mark) 23A at a part of the surface along the longitude of the origin ball 23. The notch line 23A serves to detect a deviation S in the Y-axis direction when the orientation of the probe 14 is 180-degree reversed around the axis line B.

Figure 5:
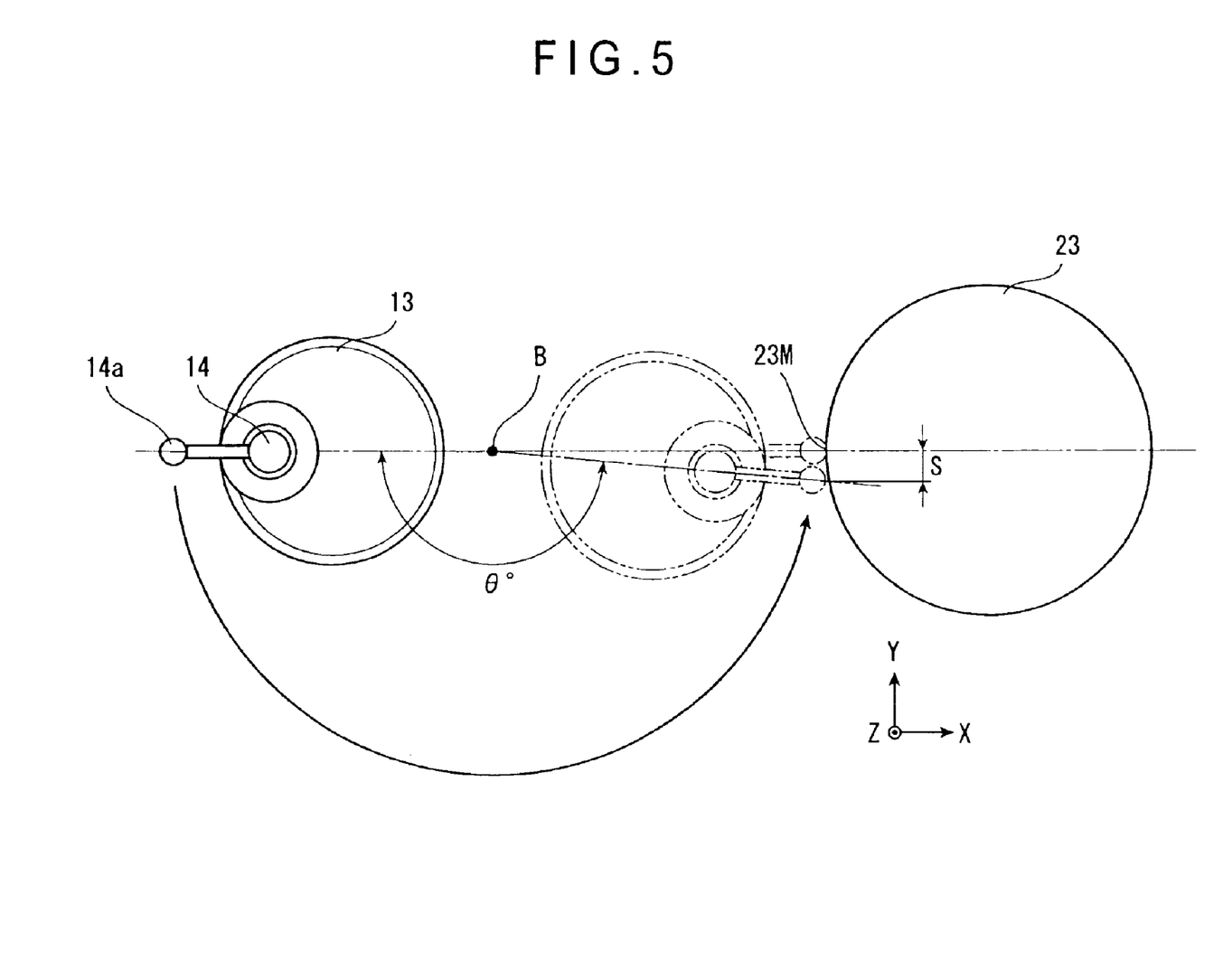
FIG. 5 is an illustration showing a relationship between the probe and an origin ball according to the embodiment.

As shown in FIG. 5, when the orientation of the probe 14 is, for instance, 180-degree reversed around the axis line B of the probe holder 13 and the probe 14 so as to be the inside diameter measuring position from the outside diameter measuring position, the phase deviation S (in the Y-axis direction) may be generated due to a mechanical division error. As the deviation S is generated, an angle at θ degrees of the probe 14 would be smaller than 180 degrees. Or, the deviation may be caused by an angle larger than 180 degrees.

The deviation S represents a displacement of the stylus 14a in the Y-axis direction according to the roundness measuring instrument 1. If the roundness measuring instrument 1 is not equipped with a displacement mechanism in the Y-axis direction, an outermost periphery 23M of the origin ball 23 is unavailable for scanning the angle over 180 degrees. Therefore, a measurement error in the Y-axis direction may be generated as the orientation of the probe 14 being reversed.

Figure 6A:
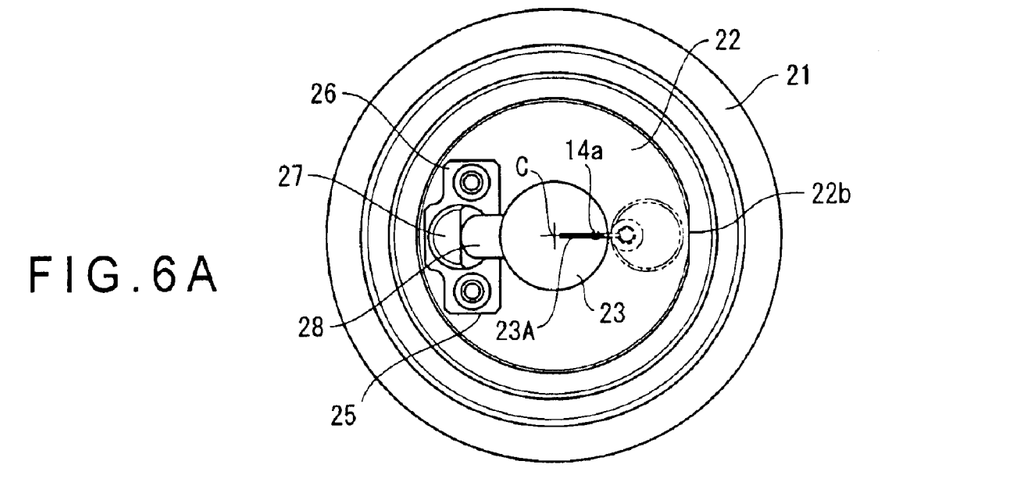
FIGS. 6A and 6B are illustrations each showing a state that the probe contacts the origin ball according to the embodiment.
Figure 6B:
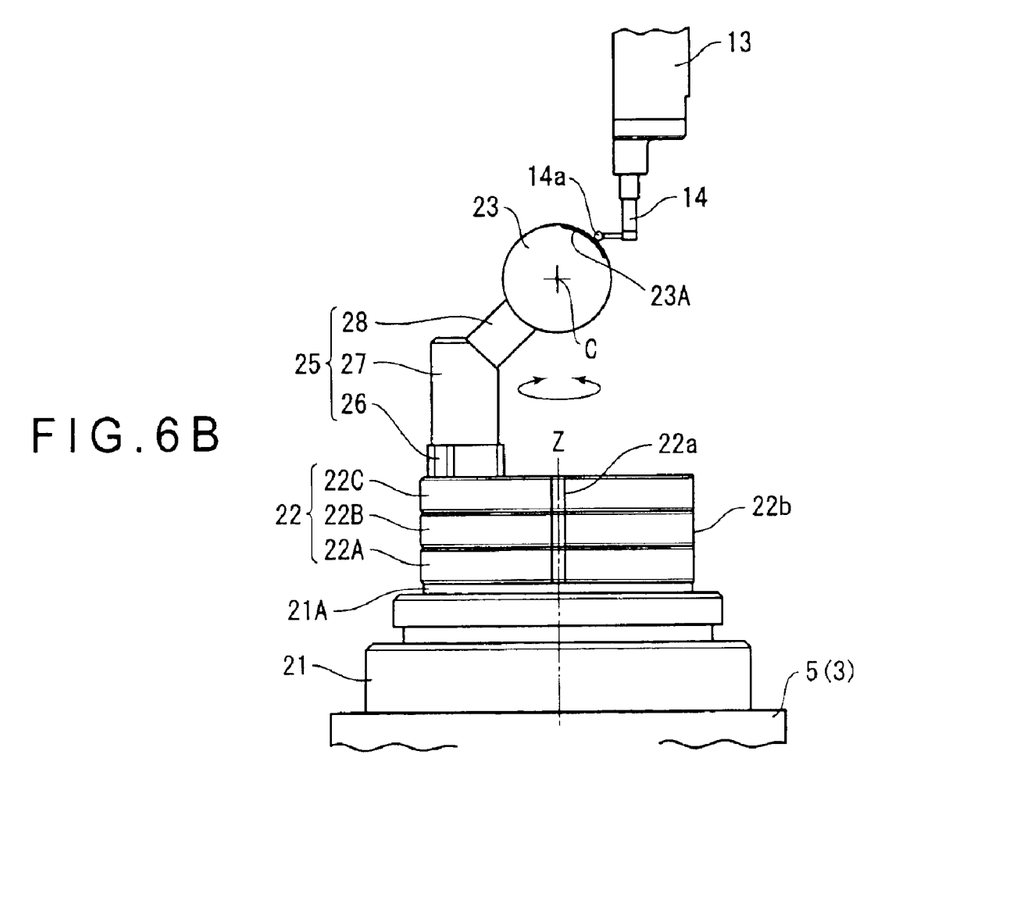
Figure 7A:
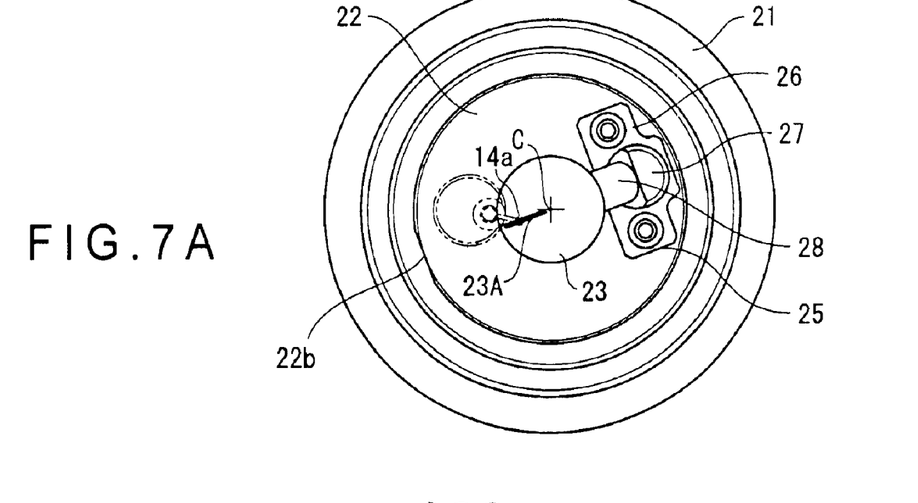
FIGS. 7A and 7B are illustrations each showing a state that the probe contacts another position of the origin ball according to the embodiment.
Figure 7B:
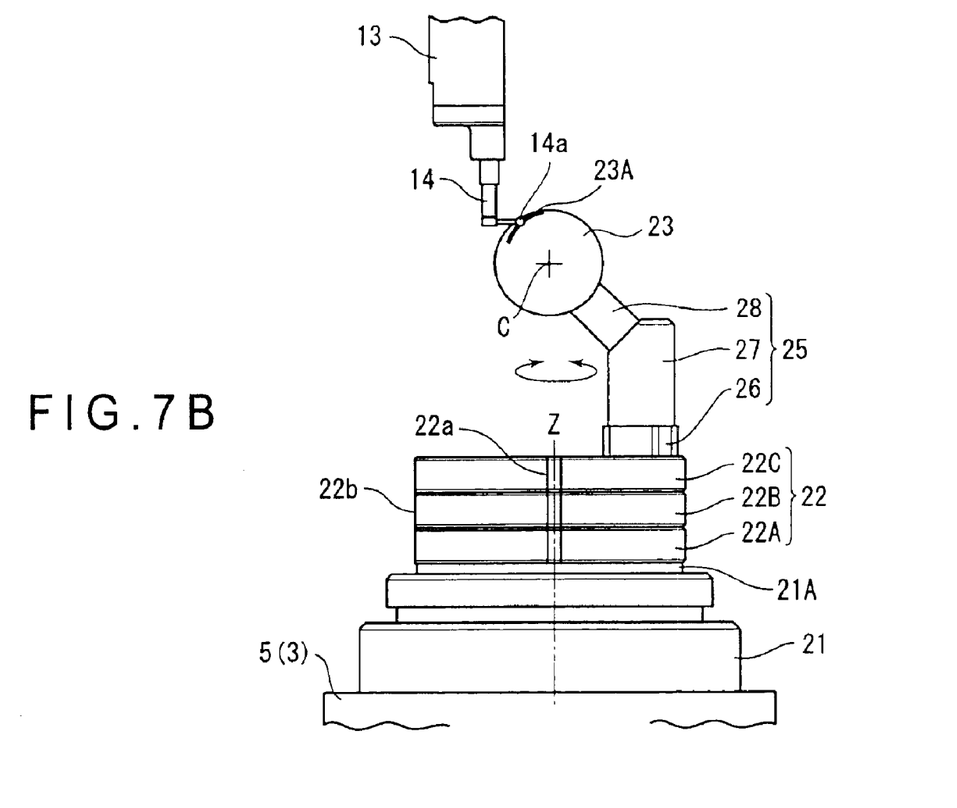

To avoid this, the notch line 23A is formed on the surface of the origin ball 23 as described above so that the position of the notch line 23A is detected while the stylus 14a contacting the surface of the origin ball 23 in the outside diameter measuring position by rotating the turntable 4 or the like of the workpiece rotary mechanism 3 to store the position according to the rotation angle of the turntable 4 as shown in FIGS. 6A and 6B for example. Then, as shown in FIGS. 7A and 7B, while the stylus 14a contacting the surface of the origin ball 23 in the inside diameter measuring position, the position of the notch line 23A is detected by rotating the turntable 4 to store the position according to the rotation angle of the turntable 4. The difference between the above measurements both in the outside diameter measuring position and the inside diameter measuring position is converted as the amount of the deviation S in the Y-axis direction at the data processor of the roundness measuring instrument 1, thus compensating the phase deviation in the Y-axis direction at the probe 14 being reversed.

Next, steps for acquiring the origin information of the roundness measuring instrument 1 and calibrating the sensitivity of the probe 14 with use of the reference fixture 20 according to the above configuration will be described. The acquisition of the origin information and the sensitivity calibration of the probe 14 are performed before an actual measurement on the workpiece W by the roundness measuring instrument 1.

Firstly, the reference fixture 20 is manually mounted on the XY table 5 of the roundness measuring instrument 1 by an operator. The areas 22A and 22C are measured by the probe 14 in the outside diameter measuring position to adjust for centering and leveling the turntable 4, the XY table 5 and the reference fixture 20 with use of the control knobs 6A and 6B provided together with the turntable 4, and the inclined knob.

Then, the probe 14 is 180-degree reversed so that the stylus 14a of the probe 14 contacts the surface of the origin ball 23 in order to detect the position of the notch line 23A in the outside diameter measuring position and the inside diameter measuring position by rotating the turntable 4 for detecting and converting the amount of the deviation S, which is the phase deviation in Y-axis direction during the measurement by the probe 14 in both position to compensate the phase deviation of the probe 14 in the Y-axis direction.

Thereafter, as shown in FIG. 2, the slider 9 is shifted in the Z-axis direction while the probe 14 being vertically oriented to scan the outermost surface of the origin ball 23 in a perpendicular direction for acquiring the coordinate of the scanned position. The orientation of the probe 14 is 180-degree reversed to obtain the coordinate of the position by scanning the outermost surface of the origin ball 23 in the perpendicular direction even in the inside diameter measuring position, and accordingly, the coordinate is fetched into the data processor of the roundness measuring instrument 1 as the origin information.

Further, when the turning part 11 as shown in FIG. 1 is rotated around the axis line A so that the probe 14 is laterally oriented (in a horizontal position) as shown in FIG. 3, and then, the probe 14 is rotated around the axis line B (refer to FIG. 1), thus measuring the origin ball 23 at its top face, bottom face, right face and left face according to the horizontal position.

In the top face measuring position and the bottom face measuring position, when the first horizontal arm 10 (refer to FIG. 1) shifts in the X-axis direction with the stylus 14a contacting the origin ball 23, the probe 14 also shifts in the X-axis direction so that the stylus 14a can scan on the surface of the origin ball 23. Since the above scanning detects the maximum value or the minimum value (at the top position in the top face measuring, or at the bottom position in the bottom face measuring), the coordinate value of the detected value is fetched into the data processor of the roundness measuring instrument 1 as the origin information.

In the right face measuring position and the left face measuring position, when the slider 9 shifts in the Z-axis direction with the stylus 14a contacting the origin ball 23, the probe 14 also shifts in the Z-axis direction so that the stylus 14a can scan on the surface of the origin ball 23. Since the above scanning detects the maximum value or the minimum value (at the rightmost position in the right face measuring, or at the leftmost position in the left face measuring), the coordinate value of the detected value is fetched in the data processor of the roundness measuring instrument 1 as the origin information.

On the basis of the fetched origin information, the position deviation (offset including a rotation deviation) of the stylus 14a in each position of the probe 14 is obtained as the compensation value.

Then, the sensitivity is measured for the stylus 14a by being related to the flat part 22b on the periphery of the calibration master 22, for example, by contacting. At this time, if the measurement value is either above or below 25 μm, which is the cutting dimension of the flat part 22b of the calibration master 22, the data processor calibrates the sensitivity since the amount of difference represents the sensitivity error of the probe 14.

As stated above, the machine origin information is acquired with use of the reference fixture 20. After the sensitivity calibration of the probe 14 is completed, the reference fixture 20 is removed from the XY table 5 and then, the workpiece W to be measured is set on the XY table 5 for performing the roundness measurement on the workpiece W followed by the centering etc.

According to the above-described reference fixture 20, following advantages can be obtained.

(1) The origin information of the roundness measuring instrument 1 can be acquired since the reference fixture 20 is mounted on the XY table 5 constituting the workpiece rotary mechanism 3 and the stylus 14a of the probe 14 is related to the origin ball 23 by contacting etc. for scanning the origin ball 23. The sensitivity can be calibrated by bringing the stylus 14a of the probe 14 into contact with the flat part 22b of the calibration master 22. Consequently, a large calculation program or the like is not necessary to acquire the origin information, the acquisition for the origin information of the roundness measuring instrument 1 and the sensitivity adjustment of the detector can be continuously performed, so that the measuring efficiency and the measuring accuracy can be enhanced.

(2) The origin ball 23 is provided on the inclined part 28 of the holder 25, the inclined part 28 being formed in a certain dimension and a shape available to measure the lowermost face of the origin ball 23, thus measuring at many measurement positions from respective directions to acquire the origin information. Therefore, the accurate origin information of the roundness measuring instrument 1 can be acquired.

(3) The calibration master 22 is partly being the flat part 22b on its periphery by cutting, for instance, with the dimension of 25 μm. As the stylus 14a measures the master area 22B including the flat part 22b, if the measurement value of the roundness etc. is different from 25 μm, the amount of difference represents the sensitivity error of the probe 14, which is all to be calibrated, thus facilitating the sensitivity calibration of the probe 14.

(4) In the roundness measuring instrument 1, the mechanical division error might be occurred when the probe 14 is 180-degree reversed around the axis line B. However, since the stylus 14a of the probe 14 contacts the surface of the origin ball 23 in order to detect the position of the notch line 23A in the outside diameter measuring position and the inside diameter measuring position by rotating the turntable 4 for detecting and converting the amount of deviation S in both positions to compensate the phase deviation of the probe 14 in the Y-axis direction, the measurement can be accurately performed even when the mechanism cannot shift the probe 14 in the Y-axis direction.

(5) Since the origin ball 23 is provided on the inclined part 28 of the holder 25 whereas the inclined part 28 is detachably disposed on the shank 27, the origin ball 23 may be easily replaced with new one when the origin ball 23 is damaged.

(6) Since the inclined part 28 holding the origin ball 23 is detachably arranged on the shank 27 in the holder 25, the inclined part 28 can be replaced with new one by detaching from the inclined part 28 when the origin ball 23 is damaged, thus facilitating the manufacturing steps etc. in compared to that the origin ball 23 is integrally formed with the shank 27 and the inclined part 28.

Incidentally, the reference fixture 20 of the present invention is not limited to the above-described embodiment, but includes various modifications as long as an object of the present invention can be achieved.

For example, in the above embodiment, though the inclined part 28 of the holder 25 is provided on the shank 27 with being approximately 45 degrees inclined relative to the shank 27, the 'approximately 45 degrees' includes 45 degrees plus or minus 1 or 2 degrees. The point is to measure the lowermost face of the origin ball 23 without interference of the inclined part 28.

Further, in the above embodiment, though the holder 25 is constituted by the receiving part 26, the shank 27 and the inclined part 28, the holder may be integrally formed so as to include a stand and an inclined part.

Though the inclined part 28 is used for holding the origin ball 23, the origin ball 23 may be hold with use of a horizontal part horizontally extending from the shank 27 to the axial direction of the calibration master 22. With such arrangement, when the turntable 4 is fixed so that the axial direction of the horizontal part is coincident with the Y-axis direction, the origin information in the outside diameter measuring position and the inside diameter measuring position as shown in FIG. 2 can be collected. Additionally, the origin information can be collected in the top face measuring position, the bottom face measuring position, the right face measuring position and the left face measuring position as shown in FIG. 3.

In the above embodiment, though the notch line 23A is formed on the surface of the origin ball 23 as the detecting mark for detecting the deviation in Y-axis direction, the deviation detecting mark may not be a notch but a bulged portion as long as the position can be determined.

In the above embodiment, though a limited example is described that the deviation detecting mark is formed on the surface of the origin ball 23, the deviation detecting mark may be provided on the lateral face of the calibration master 22 (e.g., on the master area 22C).

More specifically, referring to FIG. 2, the stylus 14a of the probe 14, which is set as the outside diameter measuring position, contacts the master area 22C from its right side to record the rotation angle position where the deviation detecting mark is detected by rotating the turntable 4. Then, the stylus 14a of the probe 20, which is set as the inside diameter measuring position, contacts the master area 22C from its left side after the probe 14 is rotated above the reference fixture 20 to record the rotation angle position where the deviation detecting mark is detected by rotating the turntable 4. The phase deviation of the probe 14 in the Y-axis direction may be compensated by detecting and converting the amount of phase deviation S in the Y-axis direction according to the recorded rotation angle positions. In such case, the two grooves 22a that represents the reference angle position may also serve as the deviation detecting mark provided on the lateral face of the calibration master 22. Further, the two grooves 22a indicating the reference angle position may be a single groove.

Though there is not provided a driver mechanism that drives the probe 14 in Y-axis direction in the above embodiment, the stylus 14a can be positioned so as to detect the displacement in Y-axis direction as the outside diameter measuring position or the inside diameter measuring position as shown in FIG. 2 since a roundness measuring instrument is configured to include a Y-axis drive mechanism or a mechanism that drives the workpiece rotary mechanism 3 in Y-axis direction. Consequently, it is available to measure at the side short of the calibration master 22 or the origin ball 23, or the opposite side (the other side) thereof. In the above measuring position, the phase deviation (in the X-axis direction for this time) along with the turn of the probe 14 may be also detected and converted to compensate the phase deviation of the probe 14 in the X-axis direction.

Further, though the position of the probe 14 is described as the position in the perpendicular direction (FIG. 2) or in the horizontal direction (FIG. 3), the probe 14 may be turned around the axis line A or the axis line B by an arbitrary angle so as to acquire the origin information in the position in an aslant direction for compensating.

Though the calibration steps in the above embodiment sequentially performs the detection for the rotation deviation of the probe 14, the acquisition of the origin information and the sensitivity calibration, the order of the calibration steps may be switched, or only a part of the steps may be performed.

The calibration steps may be automatically performed according to a series of programs.

The automatic calibration steps may include at least either one of the centering and the leveling of the reference fixture 20. That is, the roundness measuring instrument that calibrates with use of the reference fixture of the present invention may be a CNC (Computer Numerical Control) roundness measuring instrument.

Or, the present invention may be implemented by a measuring instrument of another type (e.g., coordinate measuring instrument) including a roundness measuring function.

What is claimed is:

1. A reference fixture for a roundness measuring instrument for acquiring origin information of the roundness measuring instrument that includes a workpiece rotary mechanism rotatable with a workpiece being set thereon and the detector having a sensor for measuring a surface profile of the workpiece, and calibrating a detector thereof, the reference fixture comprising:

a mount provided on a top face of the workpiece rotary mechanism;

a calibration master provided on a top face of the mount for calibrating the sensitivity of the detector by the sensor of the detector;

a reference ball disposed above the calibration master for providing the origin information of the roundness measuring instrument by the sensor of the detector; and a holder provided on the calibration master to hold the reference ball, wherein the holder is formed in a dimension capable of measuring the reference ball by the detector in Z-axis direction representing an axis line direction of the calibration master and in X-axis direction orthogonal to the axis line.

2. The reference fixture for the roundness measuring instrument according to claim 1, wherein the holder has an inclined part extending aslant toward the center of the calibration master.

3. The reference fixture for the roundness measuring instrument according to claim 2, wherein the inclined part of the holder is detachably provided on a shank standing upward on a top face of the calibration master.

4. The reference fixture for the roundness measuring instrument according to claim 1, wherein a flat part is formed on a part of a lateral periphery of the calibration master by cutting along the axial line of the calibration master with a predetermined reference dimension from the axis line so as to calibrate the sensitivity of the detector based on the result of that roundness of the lateral periphery of the calibration master including the flat part measured by the detector.

5. The reference fixture for the roundness measuring instrument according to claim 1, wherein the detector of the roundness measuring instrument is rotatable at a predetermined angle around the rotation center, and a deviation detecting mark is formed on a surface of the reference ball along the longitude of the reference ball to detect a rotation deviation when the detector is rotated at the predetermined angle.

6. The reference fixture for the roundness measuring instrument according to claim 1, wherein the detector of the roundness measuring instrument is rotatable at a predetermined angle around the rotation center, and a deviation detecting mark is formed on the other part of the lateral periphery of the calibration master along the axis direction to detect a rotation deviation when the detector is rotated at the predetermined angle.

7. The reference fixture for the roundness measuring instrument according to claim 5, wherein the predetermined angle is approximately 180 degrees and the rotation deviation represents a deviation in Y-axis direction orthogonal to the X-axis direction to which the detector shifts on a horizontal plane and also orthogonal to the Z-axis direction.

8. The reference fixture for the roundness measuring instrument according to claim 6, wherein the predetermined angle is approximately 180 degrees and the rotation deviation represents a deviation in Y-axis direction orthogonal to the X-axis direction to which the detector shifts on a horizontal plane and also orthogonal to the Z-axis direction.

* * * * *